(12) United States Patent
Chen et al.

(10) Patent No.: US 10,569,873 B2
(45) Date of Patent: Feb. 25, 2020

(54) UNMANNED AERIAL VEHICLE

(71) Applicant: ZEROTECH (SHENZHEN) INTELLIGENCE ROBOT CO., LTD., Shenzhen (CN)

(72) Inventors: Liang Chen, Beijing (CN); Feng Wang, Beijing (CN); Yaming Tang, Beijing (CN); Wuyang Huang, Beijing (CN); Dongdong Yan, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 364 days.

(21) Appl. No.: 15/433,481

(22) Filed: Feb. 15, 2017

(65) Prior Publication Data

US 2017/0313417 A1 Nov. 2, 2017

(30) Foreign Application Priority Data

Apr. 27, 2016 (CN) .................... 2016 2 0366764 U
Oct. 26, 2016 (CN) .......................... 2016 1 0948397

(51) Int. Cl.
*B64C 39/02* (2006.01)
*B64D 47/08* (2006.01)

(52) U.S. Cl.
CPC ............ *B64C 39/024* (2013.01); *B64D 47/08* (2013.01); *B64C 2201/027* (2013.01); *B64C 2201/042* (2013.01); *B64C 2201/108* (2013.01); *B64C 2201/127* (2013.01); *B64C 2201/162* (2013.01)

(58) Field of Classification Search
CPC ............ B64C 39/024; B64C 2201/027; B64C 2201/127; B64C 2201/108; B64C 2201/162; B64C 2201/042; B64D 47/08
See application file for complete search history.

(56) References Cited

U.S. PATENT DOCUMENTS

| | | | |
|---|---|---|---|
| 2015/0321755 A1* | 11/2015 | Martin | B64C 27/50 244/17.23 |
| 2016/0176520 A1* | 6/2016 | Goldstein | B64C 39/024 244/17.17 |
| 2018/0075834 A1* | 3/2018 | Fong | H04R 3/04 |
| 2018/0134369 A1* | 5/2018 | Tian | B64C 1/30 |
| 2018/0354620 A1* | 12/2018 | Baek | B64C 39/024 |
| 2019/0071178 A1* | 3/2019 | Caubel | B64C 39/024 |

FOREIGN PATENT DOCUMENTS

| | | |
|---|---|---|
| CN | 105059528 A | 11/2015 |
| CN | 205131639 U | 4/2016 |

* cited by examiner

*Primary Examiner* — Valentina Xavier
(74) *Attorney, Agent, or Firm* — Scully Scott Murphy & Presser

(57) ABSTRACT

An embodiment of the present disclosure provides an unmanned aerial vehicle, An unmanned aerial vehicle, with a double-layered structure formed by stacking a cover and a main component layer, wherein, the main component layer includes a base body and at least one functional component, the base body has a top facing to the cover layer and a bottom opposite to the top, the cover is in direct contact with the top of the base body, and the at least one functional component is mounted on the base body.

34 Claims, 20 Drawing Sheets

1

UNMANNED AERIAL VEHICLE

TECHNICAL FIELD

The embodiment of the present disclosure relates to an unmanned aerial vehicle.

BACKGROUND

A conventional housing of an unmanned aerial vehicle is generally comprised of a cover, an intermediate layer and a lower layer. Most functional components such as battery, circuit board and sensor are integrated in the intermediate layer. Thus, the unmanned aerial vehicle of a three-layer structure is formed. The unmanned aerial vehicle of such structure is complex in form and large in volume, and hence not only increases the process steps of production and assembly but also increases the material cost and the labor cost of complete sets.

SUMMARY

An embodiment of the present disclosure provides an unmanned aerial vehicle, An unmanned aerial vehicle, with a double-layered structure formed by stacking a cover and a main component layer, wherein, the main component layer includes a base body and at least one functional component, the base body has a top facing to the cover layer and a bottom opposite to the top, the cover is in direct contact with the top of the base body, and the at least one functional component is mounted on the base body.

BRIEF DESCRIPTION OF THE DRAWINGS

Simple description will be given below to the accompanying drawings of the embodiments to provide a more clear understanding of the technical solutions of the embodiments of the present disclosure. It should be understood that the following drawings only illustrate some embodiments of the present disclosure and should not be regarded as the limitation of the scope of the present disclosure. Other accompanying drawings can be obtained by those skilled in the art without creative efforts on the basis of the accompanying drawings.

DETAILED DESCRIPTION

For more clear understanding of the objectives, technical solutions and advantages of the embodiments of the present disclosure, clear and complete description will be given below to the technical solutions of the embodiments of the present disclosure with reference to the accompanying drawings of the embodiments of the present disclosure. Obviously, the preferred embodiments are only partial embodiments of the present disclosure but not all the embodiments.

Therefore, the following detailed description on the embodiments of the present disclosure is not intended to limit the scope of protection of the present disclosure and only intended to illustrate partial embodiments of the present disclosure. All the other embodiments obtained by those skilled in the art without creative efforts on the basis of the embodiments of the present disclosure shall all fall within the scope of protection of the present disclosure.

It should be noted that the embodiments of the present disclosure and the characteristics and the technical solutions in the embodiments may be combined with each other without conflict.

It should be noted that: because like numerals and letters indicate like items in the following accompanying drawings, once an item is defined in an accompanying drawing, further definition and explanation are not repeated in subsequent accompanying drawings.

The terms "first", "second" and the like are only used for distinguished description and should not be regarded as the indication or implication of the relative importance.

Embodiments of the present disclosure provide an unmanned aerial vehicle with simple structure, small volume and low processing cost. The unmanned aerial vehicle according to the embodiment of the present disclosure is a double-layered structure consists of a cover layer and a main component layer. Compared with the conventional unmanned aerial vehicle, the middle layer is eliminated, thus the structure and assembly process is simplified, the volume is reduced, and the material costs and labor costs are reduced.

Figure 1:
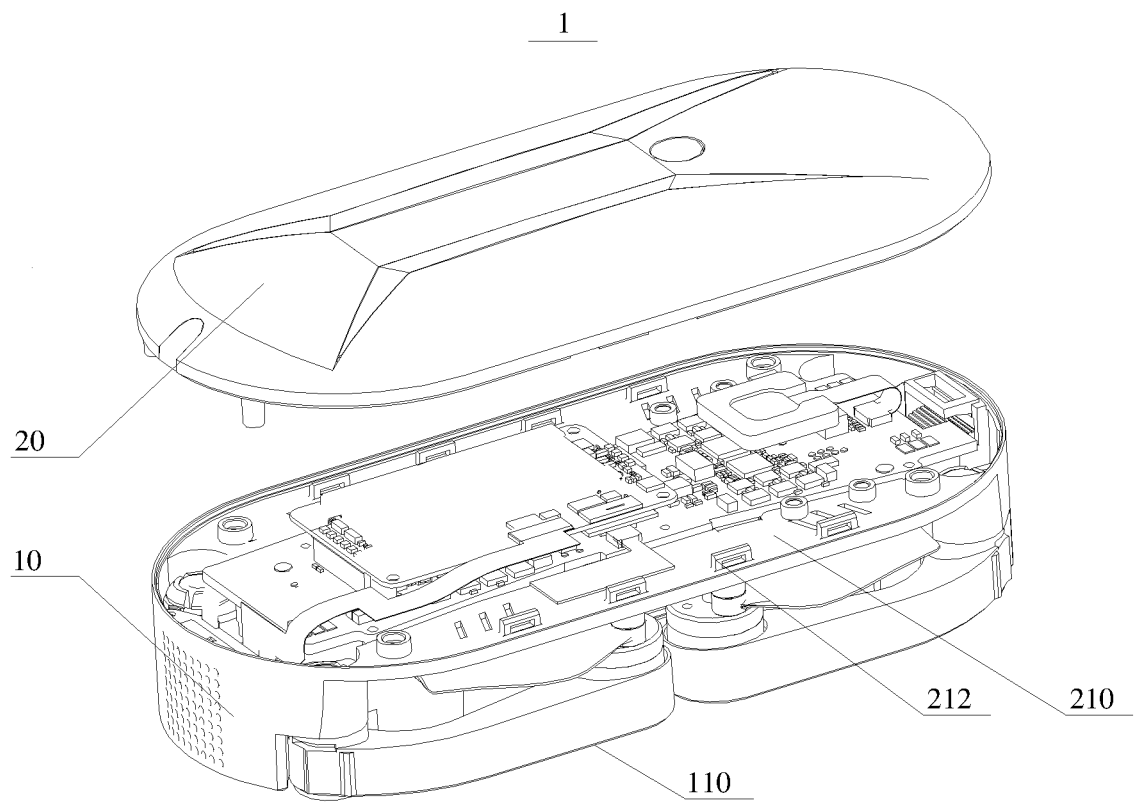
FIG. 1 is an overall structural schematic diagram A of an unmanned aerial vehicle provided by an embodiment of the present disclosure.

Reference is made to FIG. 1 which is an overall structural schematic diagram A of an unmanned aerial vehicle 1 provided by an embodiment of the present disclosure.

The unmanned aerial vehicle 1 has a double-layered structure formed by stacking a main component layer 10 and a cover 20. The body component layer 10 includes a base 200 and functional components. The cover 20 is in direct contact with the base 200, and the functional components are mounted on the base 200.

The double-layered structure means that the overall profiles of the main component layer 10 and the cover 20 are substantially flat, so that the unmanned aerial vehicle 1 has an overall appearance of two layer stacked structure.

Figure 2:
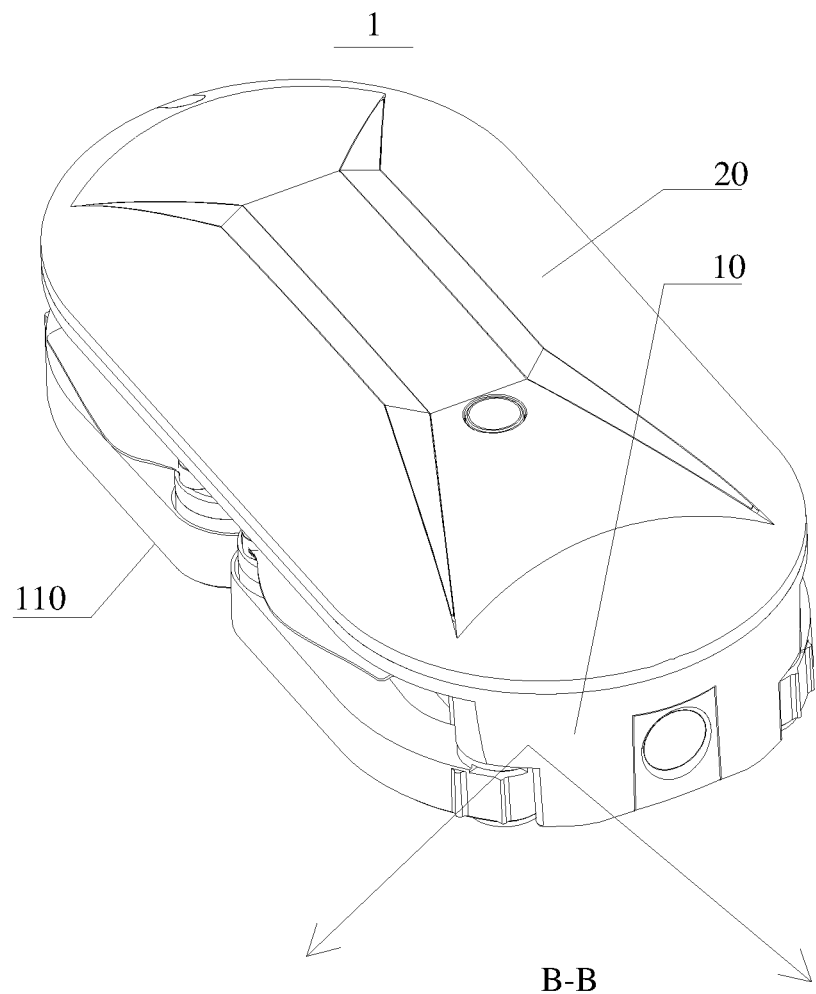
FIG. 2 is an overall structural schematic diagram B of the unmanned aerial vehicle provided by the embodiment of the present disclosure.

The cover 20 and the base body 200 of the main component layer 10 are connected to each other, and the specific connection means is not limited. The main component layer 10 can realize all the functions without the cover 20, because the functional components are all integrated on the base body 200. In the present embodiment, a plurality of upper buckles (not shown) are provided at an edge of the bottom surface of the cover 20, and a plurality of lower buckles 212 are provided at an edge of the upper surface 210 of the base body 200. Referring to FIG. 2 which is an overall structural schematic diagram B of an unmanned aerial vehicle 1 according to the embodiment of the present disclosure, the upper buckles and the lower buckles 212 are engaged with each other so that the cover 20 and the base body 200 are integrally connected to each other.

It should be noted that: in another embodiment, the cover 20 and the base body 200 can also be connected with each other by bolt connection, magnet adsorption, hot melt connection, riveting, welding or other means.

The functional components of the unmanned aerial vehicle 1 are all integrated onto the base body 200. The functional components mounted onto the bottom of the base body 200 are all located in an accommodating recess(es) of the base body 200, wherein the top of the base body 200 is connected with the cover 20, and the bottom of the base body 200 is opposite to the top. Thus, the unmanned aerial vehicle 1 having a double-layered structure can be formed. Compared with the conventional unmanned aerial vehicle, the intermediate layer is omitted, so that the structure and the assembly process are simplified, the volume is reduced, and the material and labor costs are decreased. In one embodiment, the unmanned aerial vehicle has a weight less than or equal to 500 grams, and the unmanned aerial vehicle has a maximum dimension in a thickness direction of not more than 80 mm.

Hereinafter, the mounting of the functional components of the unmanned air vehicle 1 on the base body 200 will be described in detail.

Figure 3:
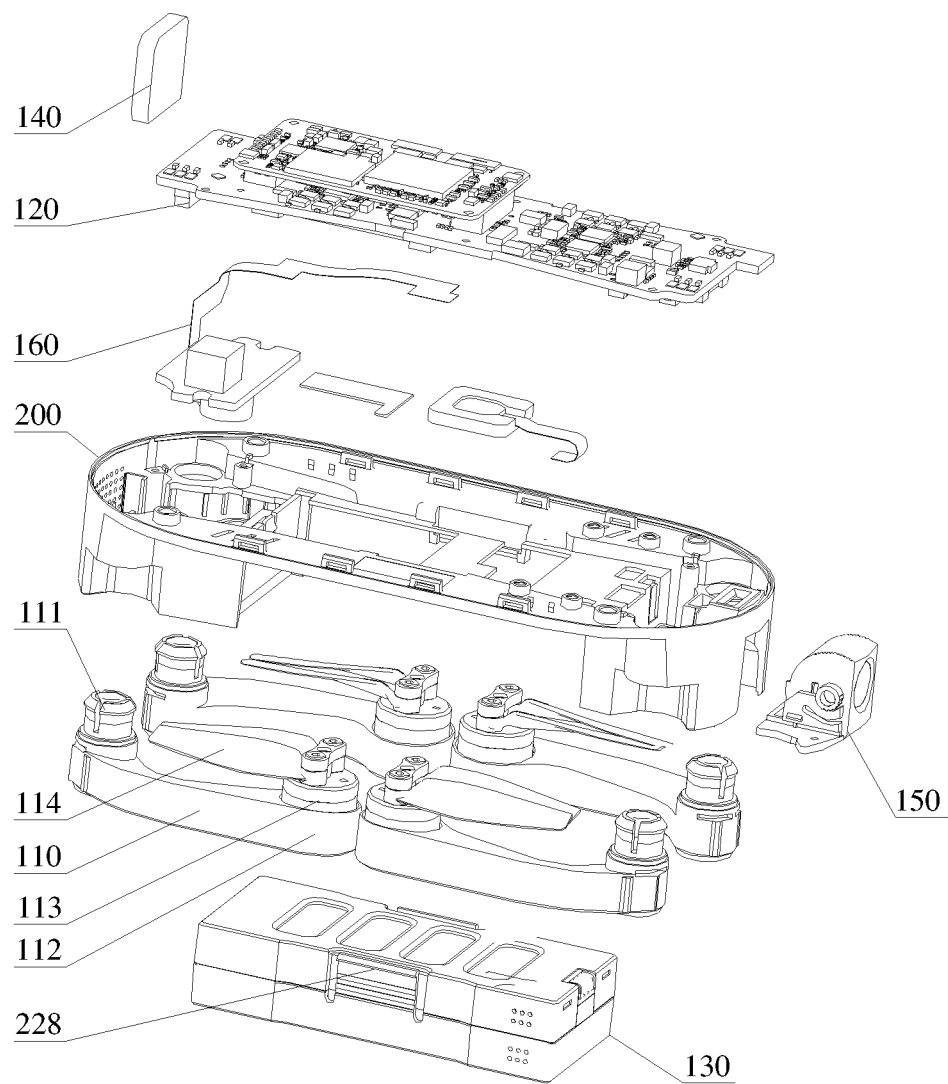
FIG. 3 is an exploded perspective view of a base body and functional components in the unmanned aerial vehicle provided by the embodiment of the present disclosure.

FIG. 3 is an exploded perspective view of the base body 200 and the functional components of the unmanned aerial vehicle 1 provided by the embodiment of the present disclosure. As illustrated in FIG. 3, the functional components of the unmanned aerial vehicle 1 include arms 110, circuit board 120, battery 130, heat dissipation device 140, camera 150 and sensor component 160.

Figure 4:
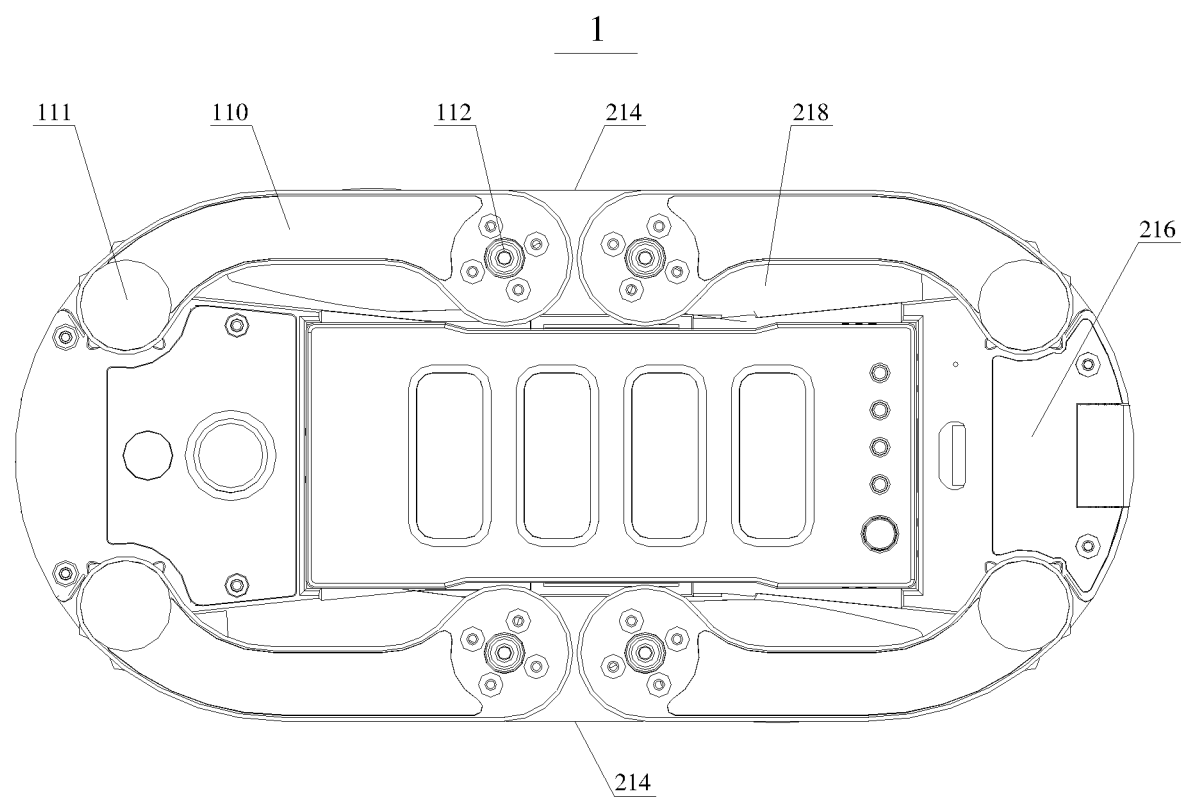
FIG. 4 is a bottom view of the unmanned aerial vehicle provided by the embodiment of the present disclosure, in which arms are in a housed state.

FIG. 4 is a bottom view of the unmanned aerial vehicle 1 provided by the embodiment of the present disclosure, in which the arms 110 are in a housed state. Referring to FIGS. 3 and 4, the base body 200 includes two side surfaces 214 opposite to each other in a width direction. Two arm accommodating recesses 218 are formed by the inward recessions at connection positions of the side surfaces 214 and the bottom surface 216 of the base body 200 respectively. The functional components include four arms 110. Two ends of each arm 110 are formed as a connecting end 111 and a power end 112 respectively. A motor 113 is disposed on the power end 112 to be connected with a propeller 114. Two arms 110 are disposed in each arm accommodating recess 218. In each arm accommodating recess 218, the connecting ends 111 of the two arms 110 are respectively rotatably connected with the base body 200, and the two arms 110 are disposed along a length direction of the base body 200. In FIG. 4, the arms 110 are in the housed state. In this case, the arms 110 are completely accommodated into the arm accommodating recess 218. That is, in the bottom view of FIG. 4, each of the arms 110 does not substantially extend beyond the outer edge of the base 200.

Referring to FIGS. 1 and 2 again, in the case where the arms 110 are in the housed state, since the arms 110 are completely accommodated by the arm accommodating recesses 218, the unmanned aerial vehicle 1 has an integrated outer profile, and the volume of the unmanned aerial vehicle 1 can be reduced to the smallest, not only more beautiful, but also more convenient to carry.

Figure 5:
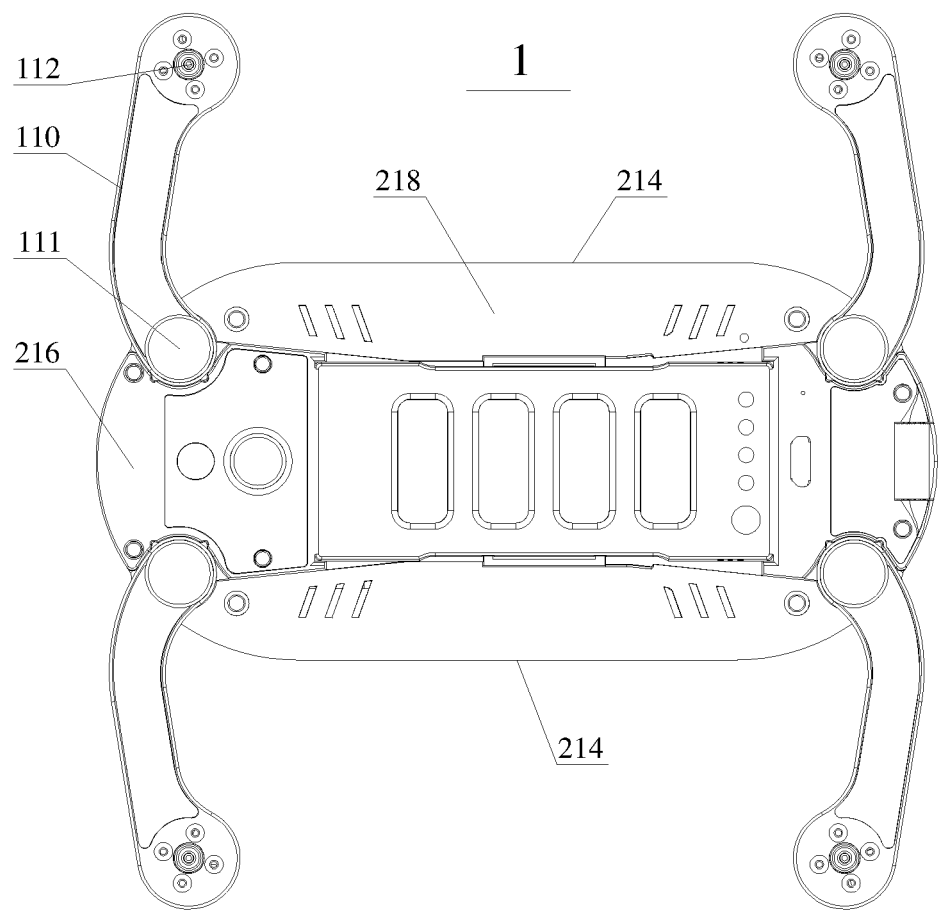
FIG. 5 is a bottom view of the unmanned aerial vehicle provided by the embodiment of the present disclosure, in which the arms are in an unfolded state.

FIG. 5 is a bottom view of the unmanned aerial vehicle 1 provided by the embodiment of the present disclosure, in which the arms 110 are in an unfolded state. As illustrated in FIG. 5, the arms 110 rotate around connected positions of the connecting ends 111 and the base body 200, so that the power ends 112 of the arms 110 can be away from the base body 200. The arms 110 are in the unfolded state. In this case, the motors 113 on the power ends 112 drive the propeller 114 to operate, and hence can drive the unmanned aerial vehicle 1 to fly.

It should be noted that: in other embodiments, the number of the arms 110 is not limited to four, two, three, five and six arms 110 are all feasible. Similarly, the number of the arm accommodating recesses 218 is also not limited to two.

It should be noted that: in another embodiment, the arms 110 may also be telescopically connected with the base body, so as to retract into the arm accommodating recesses 218 and be in the housed state, or extend out from the arm accommodating recesses 218 and hence be in the unfolded state.

The base body 200 and the connecting end 111 of the arm 110 are connected with each other by a connecting structure 300. Structure examples of the connecting structure 300 will be described in detail below.

Connecting Structure Example I

Figure 6:
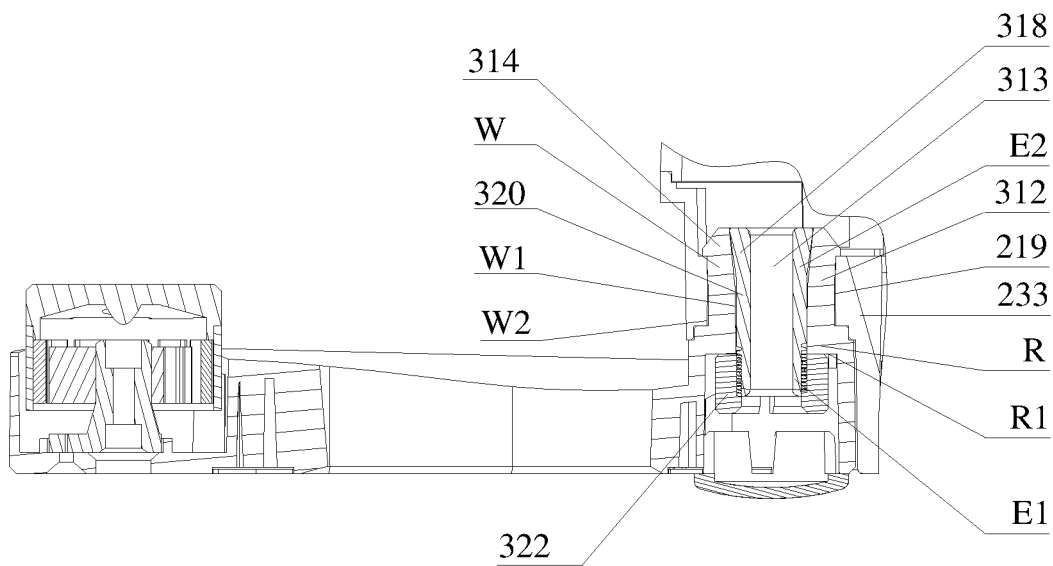
FIG. 6 is cross-sectional view showing a portion of a structure in which an arm is connected to an base body in an embodiment of the present disclosure.
Figure 7:
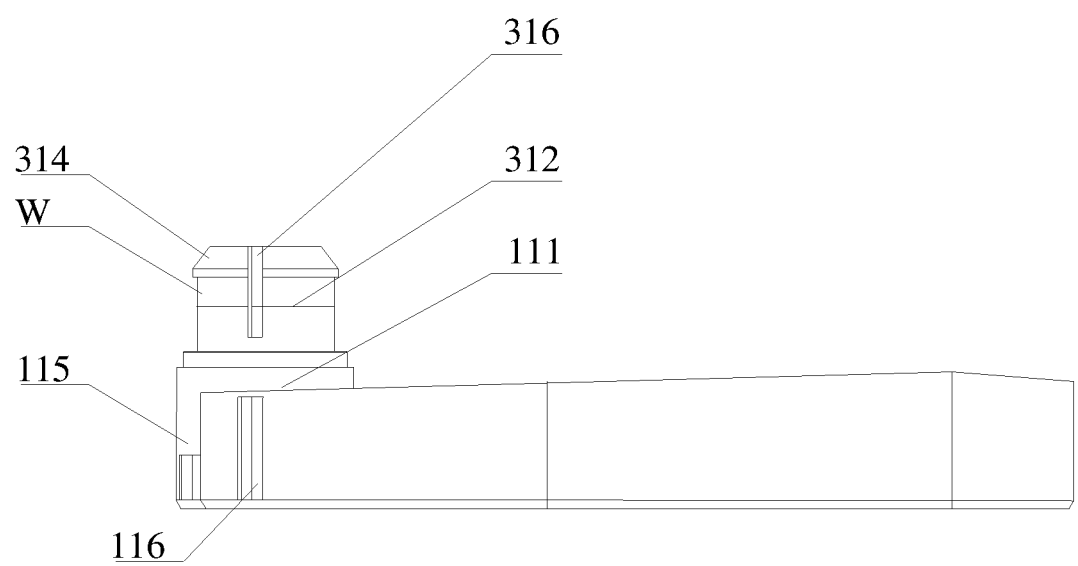
FIG. 7 is a side view of the arm in the unmanned aerial vehicle provided by an embodiment of the present disclosure.
Figure 8:
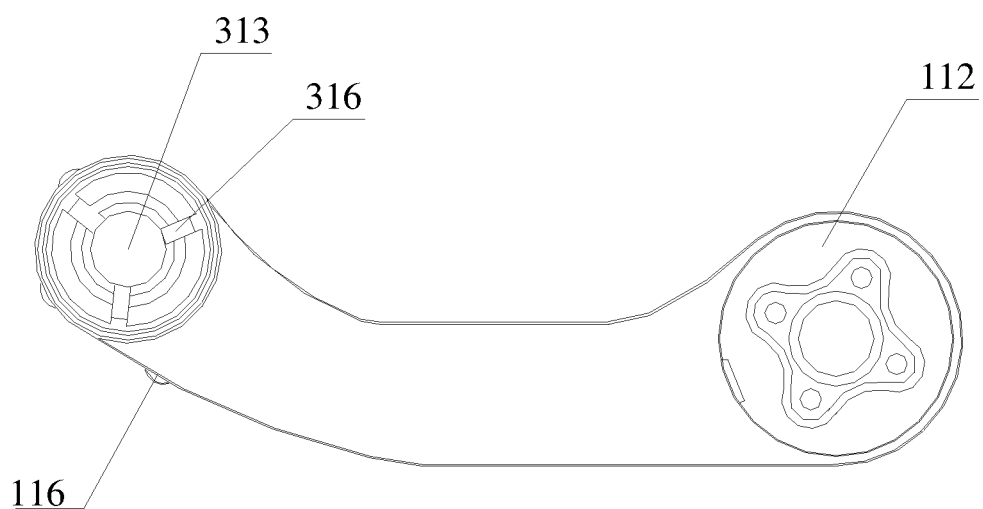
FIG. 8 is a top view of the arm of the in the unmanned aerial vehicle provided by the embodiment of the present disclosure.

Referring to FIGS. 6-8, in an embodiment, at the connecting end 111 of the arm 110, the arm-base body connecting structure includes a protrusion portion 312 extending in a direction (e.g., a vertical direction) perpendicular to a plane in which the arm moves (e.g., a horizontal plane). For example, see FIGS. 7-8, a first arm matching part 116 is for example disposed on an outer surface 115 of the connecting end 111. The protrusion portion 312 is disposed on an upper surface of the connecting end 111 of the arm 110 which abuts the outer surface 115. A first through hole 219 through which the protrusion portion 312 passes is provided in the base body 200. The protrusion portion 312 is provided with a flange 314 on the top. The flange 314 is configured to prevent the protrusion portion 312 from detaching from the first through hole 219. For example, an outer diameter of the flange 314 is larger than a diameter of the opening of the first through hole 219 adjacent to the flange 314. The bottom portion of the protrusion portion 312 is fixedly connected to the connecting end 111 of the arm 110 located below the first through hole 219, and the top of the protrusion portion 312 is confined above the first through hole 219 via the flange 314. Thus, the protrusion portion 312 can be rotated in the first through hole 219 without detaching from the first through hole 219.

For example, the protrusion portion 312 has a cylindrical shape. A second through hole 313 is provided in the protrusion portion 312, and the second through hole 313 is provided coaxially with the first through hole 219, for example.

For example, the wall W of the protrusion portion 312 has an inner surface W1 and an outer surface W2. At least one slot 316 penetrating the wall W is provided in the cylinder wall W of the protrusion portion 312. Referring to FIG. 8, the wall W of the protrusion portion 312 is provided with three slots 316 penetrating the tube wall W, each extending, for example, in a direction perpendicular to the plane of movement of the arm. Thus, the outer diameter of the protrusion portion 312 is variable under an action of an external force. Here, the external force means a force applied to the protrusion portion 312 by any other object other than the protrusion portion 312 itself. For example, the outer diameter of the protrusion portion 312 is made smaller by an external force so that the flange 314 located at the top of the protrusion portion 312 can enter into the first through hole 219 of the base body 200, so that the arm 110 is mounted on the base body 200; and when entering into the base body 200, the protrusion portion 312 is restored to its original outer diameter by its own elasticity, and is further locked at the base body 200 by the flange 314. It should be understood that the number and extending direction of the slot(s) 316 is not limited in embodiments of the present disclosure.

For example, referring to FIG. 6, the arm-base body connecting structure may further include a reinforcing member 318 provided in the second through hole 313 of the protrusion portion 312. The reinforcing member 318 is configured to press the wall W of the protrusion portion 312 to be pressed against a sidewall 233 of the base body 200 adjacent to the first through hole 219.

For example, referring to FIG. 6, the reinforcing member 318 includes a bolt 320 and a nut 322 that engages with each other through screw threads. The bolt 320 has a first end E1 and a second end E2 opposite to each other. The first end E1 is provided with a thread that matches with a thread of the nut 322, and the second end E2 is free of thread. The second end E2 of the bolt 320 is closer to the flange 314 of the protrusion portion 312 with respect to the first end E1, and has a shape of, for example, circular truncated cone. The bolt 320 for example is hollow, so that a wire can pass therethrough. A step portion R is disposed on the inner surface W1 of the wall W of the protrusion portion 312, and the step portion R is configured to limit the movement of the nut 322 in the second through hole 313. For example, the nut 322 located below the step portion R abuts against the lower surface R1 of the step portion R, and the second end E2 of the bolt 320 which has the shape of circular truncated cone abuts against the wall W of the protrusion portion 312, such that the wall W of the protrusion portion 312 is closely pressed against the sidewall 233 of the base body 200 adjacent to the first through hole 219.

FIG. 5 is a bottom view of the unmanned aerial vehicle 1 in a working state in the embodiment of the present disclosure. With reference to FIG. 5, the arms 110 are rotated relative to the base body 200 so that the arms 110 are switched between the unfolded position and the housed position. When the arms 110 rotate to the unfolded position, the propeller and the motor on the power end 112 are operated to drive the unmanned aerial vehicle 1 to fly.

Figure 9:
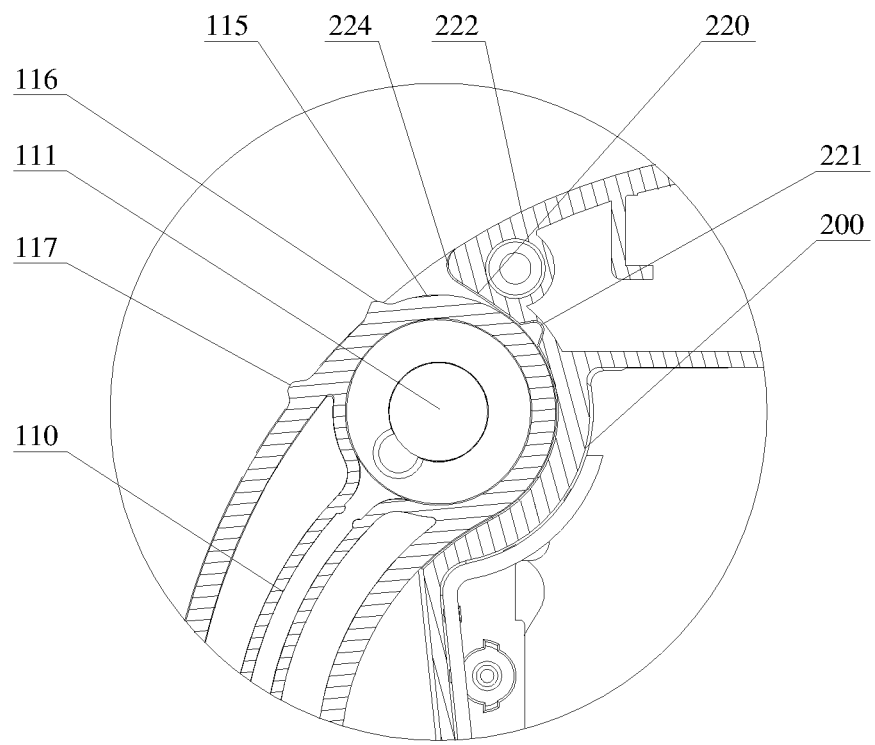
FIG. 9 is a cross-sectional view of FIG. 2 in a B-B direction.

FIG. 9 is a sectional view of FIG. 2 in a B-B direction. With reference to FIG. 9, the connecting end 111 of the arm 110, for example, is provided with an arc outer surface 115. The base body 200 is provided with an arc inner wall 220 adaptive to the outer surface 115. A base body matching part is provided on the inner wall 220. A groove is disposed on the inner wall 220 so as to be adopted as the base body matching part, i.e., a first base body matching part 221. An arm matching part is provided on the outer surface 115 of the connecting end 111 of the arm 110. A projection is disposed on the outer surface 115 so as to be adopted as the arm matching part, i.e., a first arm matching part 116. The first arm matching part 116 rotates along with the arm 110. The first base body matching part 221 is positioned on a rotation track of the first arm matching part 116. The first arm matching part 116 can enter the first base body matching part 221 by insertion, and is tightly combined with the first base body matching part 221. As shown in FIG. 9, the arm 110 is in the housed position and the first arm engaging portion 116 is not in contact with the inner wall 220.

Figure 10:
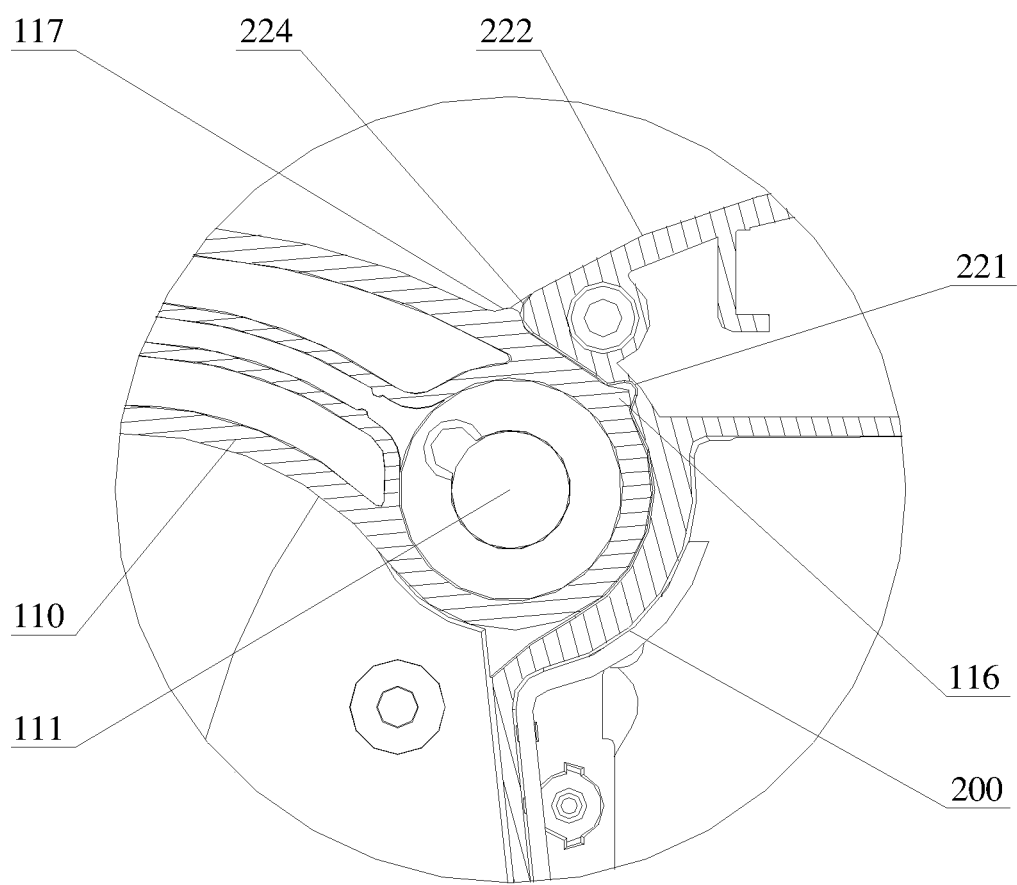
FIG. 10 is a state diagram showing that the arm in FIG. 9 has moved to an unfolded position.

FIG. 10 is a state diagram showing that the arm 110 in FIG. 9 has rotated to the unfolded position. With reference to FIG. 10, in the process that the arm 110 rotates around the connection position of the connecting end 111 of the arm 110 and the base body 200 so as to be away from the base body 200, the first arm matching part 116 enters the first base body matching part 221, and is insertion matched with the first base body matching part 221. Therefore, the unfolded position of the arm 110 is effectively maintained by insertion matching of the first arm matching part 116 and the first base body matching part 221. It is difficult to cause influence on the position of the arm 110 by vibration generated in the working process of the propeller and the motor, thereby effectively alleviating the problem of excessive shake of the arm 110 in the flight process.

It should be noted that in another embodiment, a projection disposed on the inner wall 220 can be adopted as the base body matching part, and a groove disposed on the outer surface 115 can be adopted as the arm matching part.

For example, another projection also can be provided on the outer surface 115 so as to be adopted as an abutting part 117; and a surface between the inner wall 220 and an outer wall 222 of the base body 200 is provided as an abutting face 224, for example. When the arm 110 is positioned at the unfolded position, the abutting part 117 abuts against the abutting face 224. Therefore, the unfolded position of the arm 110 can be more firmly maintained.

In order to enable the first arm matching part 116 to insert into the first base body matching part 221, an interval between the outer surface 115 and the inner wall 220 of the base body 200 is smaller than a length of the first arm matching part 116 protruding from the outer surface 115. In order to enable the first arm matching part 116 to successfully pass through a space between the outer surface 115 and the inner wall 220 and enter the first base body matching part 221, the first arm matching part 116, for example, can be made of an elastic material. Therefore, during the arm 110 rotates to the unfolded position, the first arm matching part 116 generates deformation so as to enter the space between the outer surface 115 and the inner wall 220. After reaching the position of the first base body matching part 221, the first arm matching part 116, for example, is restored to a normal state under the action of the elastic force thereof so as to enter the first base body matching part 221 and form insertion matching with the first base body matching part 221.

It should be noted that the elastic material can be a plastic material having an elastic deformation capacity. It also should be noted that, not only the first arm matching part 116, but also the whole of the connecting end 111 can be made of an elastic material. In addition, the first base body matching part 221 also can be made of an elastic material. Because the first base body matching part 221 is the groove disposed on the inner wall 220, that the first base body matching part 221 is made of the elastic material means that the part of the base body 200 corresponding to the inner wall 220, is made of the elastic material. Of course, both the first arm matching part 116 and the first base body matching part 221 can be made of the elastic materials.

Figure 11:
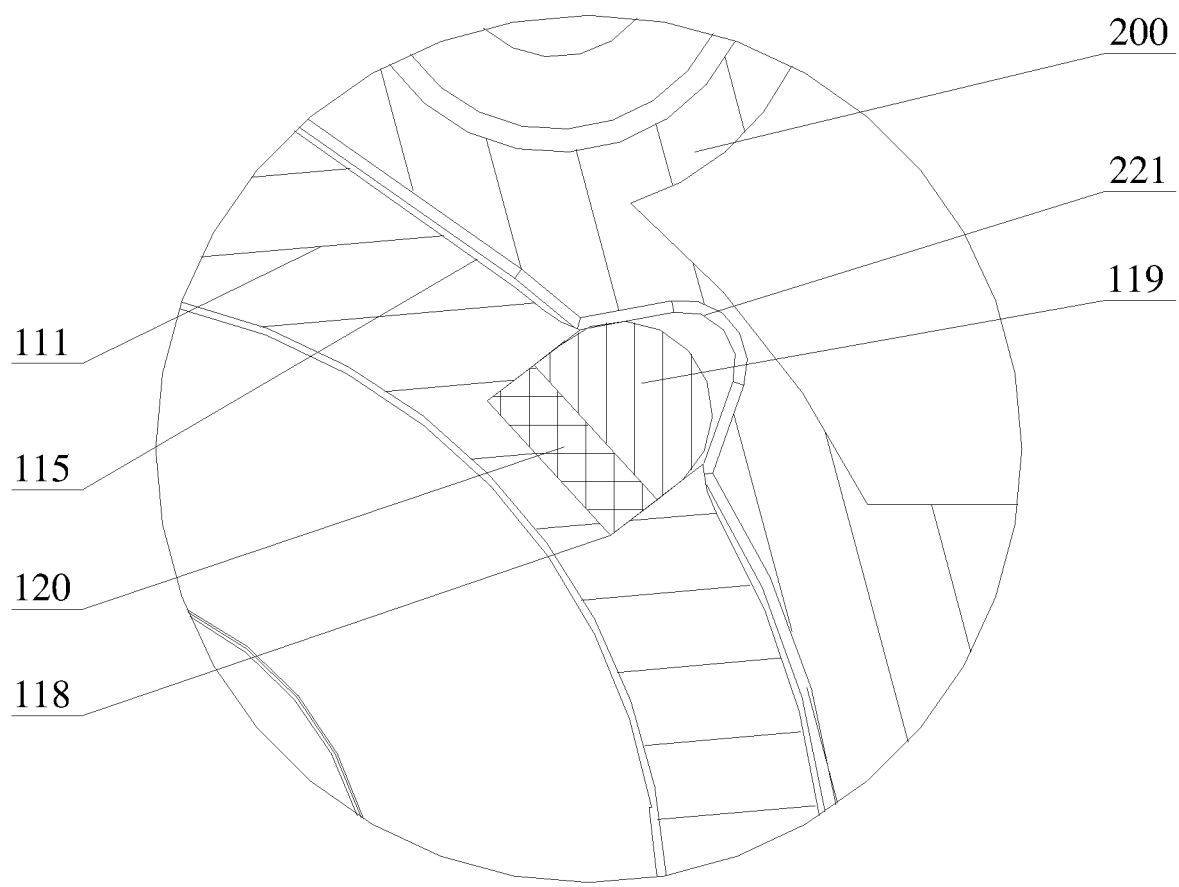
FIG. 11 is a schematic diagram showing that insertion matching of an arm matching part and an base body matching part is achieved by an elastic part in an embodiment of the present disclosure.

In another embodiment mode, an elastic force for insertion matching of the arm matching part and the base body matching part can be provided by an elastic part. FIG. 11 is a schematic diagram showing that the arm matching part and the base body matching part are driven to form insertion matching by an elastic part in an embodiment of the present disclosure. With reference to FIG. 11, a chute 118 is disposed on the outer surface 115, a sliding block 119 used as the arm matching part is provided in the chute 118 in a slidable manner, and a resilient pad 121 used as the elastic member is provided in the chute 118. The sliding block 119 is ejected from the chute 118 by a restoring force of the resilient pad 119. Under the action of the restoring force of the resilient pad 121, the sliding block 119 enters the first base body matching part 221, and is matched with the first base body matching part 221 by inserting. The sliding block 119 enters into the chute 118 against the restoring force of the resilient pad 121 by the inner wall 220 when the arm 110 is rotated. It should be noted that a spring also can be adopted as the elastic part.

In another embodiment mode, insertion matching of the arm matching part and the base body matching part also can be achieved by an adsorption force. For example, without arranging elastic part in the chute 118, the sliding block 119 is composed of a magnetic metal, and magnet is provided in the base body 200. Therefore, when the arm 110 is positioned at the unfolded position, under the action of adsorption of magnet, the sliding block 119 enters the first base body matching part 221, and is matched with the first base body matching part 221 by inserting. When the arm 110 rotates, under the action of the inner wall 220, the sliding block 119 overcomes the adsorption force of the corresponding magnet to enter the chute 118.

Figure 12:
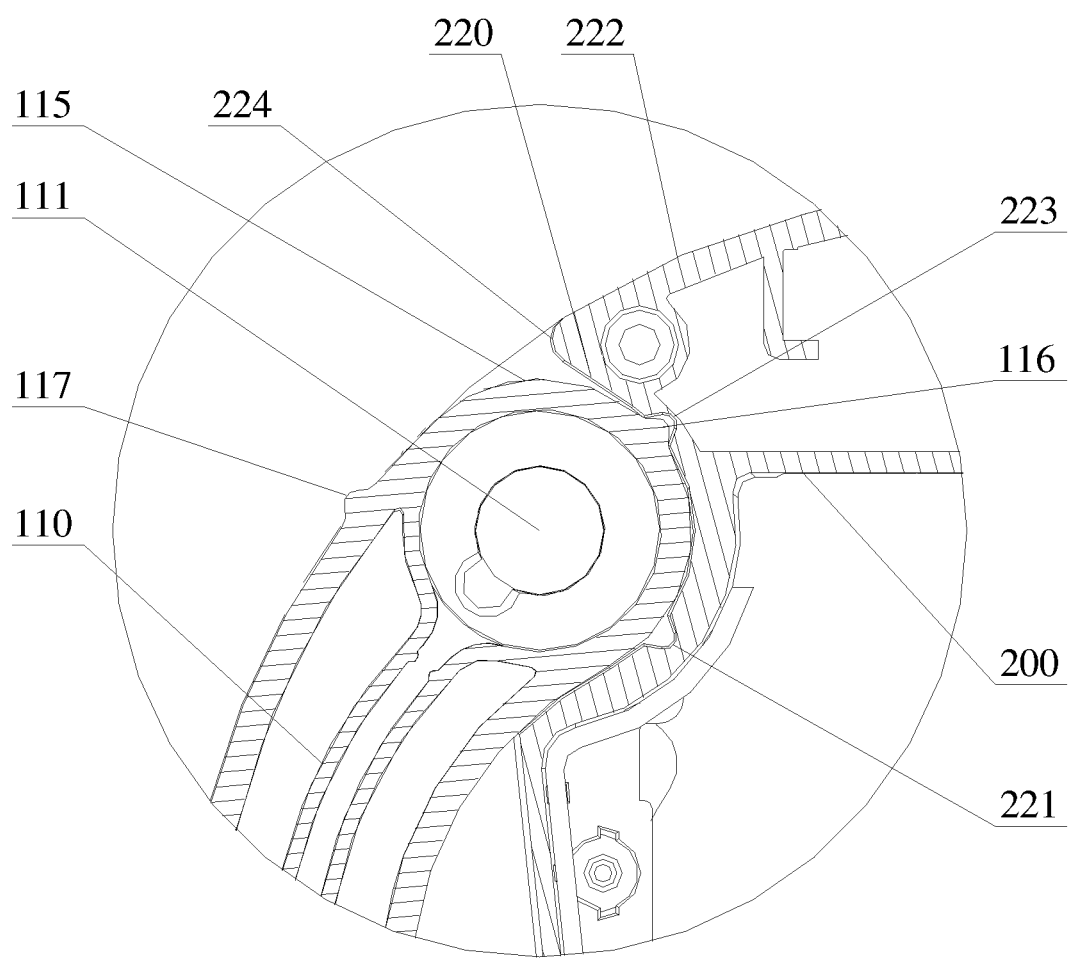
FIG. 12 is a structural schematic diagram showing another arm-base body connecting structure in an embodiment of the present disclosure.

FIG. 12 is a structural schematic diagram of an arm-base body connecting structure provided by another embodiment of the present disclosure.

With reference to FIG. 12, two base body matching parts are provided on the base body 200. Two grooves spaced apart are provided on the inner wall 220 to be adopted as two base body matching parts, i.e., the first base body matching part 221 and a second base body matching part 223. One arm matching part is provided on the arm 110. A projection on the outer surface 115 is provided as an arm matching part, i.e., the first arm matching part 116. The first arm matching part 116 moves along with rotation of the arm 110. The first base body matching part 221 and the second base body matching part 223 are positioned on the rotation track of the first arm matching part 116. The first arm matching part 116 can enter the first base body matching part 221 and the second base body matching part 223 by inserting, and is tightly combined with the first base body matching part 221 and the second base body matching part 223.

In FIG. 12, the arm 110 is in the housed position, and the first arm matching part 116 and the second base body matching part 223 form insertion matching. Therefore, the housed position of the arm 110 is effectively maintained by insertion matching of the first arm matching part 116 and the second base body matching part 223.

Figure 13:
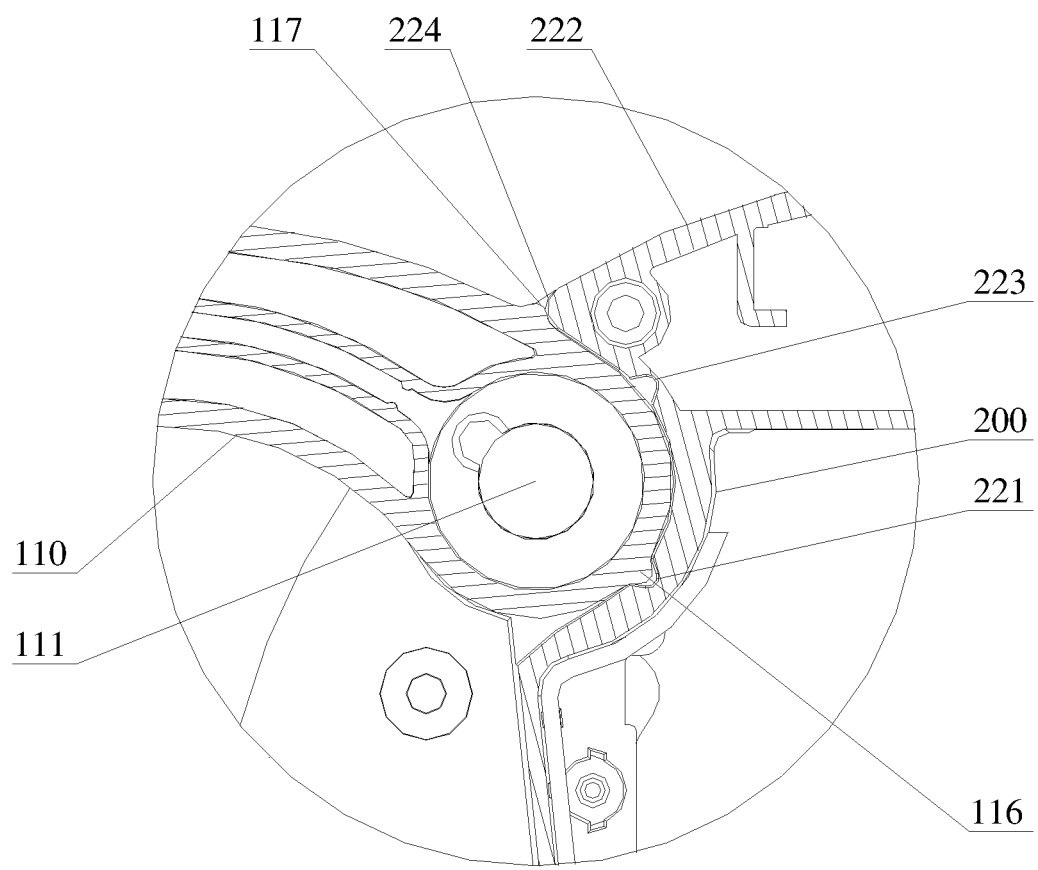
FIG. 13 is a state schematic diagram showing that the arm in FIG. 12 has moved to an unfolded position.

FIG. 13 is a state schematic diagram showing that the arm 110 in FIG. 12 has moved to the unfolded position. With reference to FIG. 13, the arm 110 rotates around the connecting end 111 to the unfolded position, the first arm matching part 116 enters the first base body matching part 221 and is matched with the first base body matching part 221 by inserting. Therefore, the unfolded position of the arm 110 is effectively maintained by insertion matching of the first arm matching part 116 and the first base body matching part 221. It is difficult to cause influence on the position of the arm 110 by vibration generated in the working process of the propeller and the motor, thereby effectively alleviating the problem of excessive shake of the arm 110 in the flight process.

Therefore, through rotation of the arm 110, the first arm matching part 116 is optionally matched with the first base body matching part 221 and the second base body matching part 223 by inserting, so that the housed position and the unfolded position of the arm 110 can be effectively maintained.

It should be noted that, in another embodiment mode, other base body matching parts can be further provided between the first base body matching part 221 and the second base body matching part 223 so that the arm 110 can be maintained in other positions between the housed position and the unfolded position.

Figure 14:
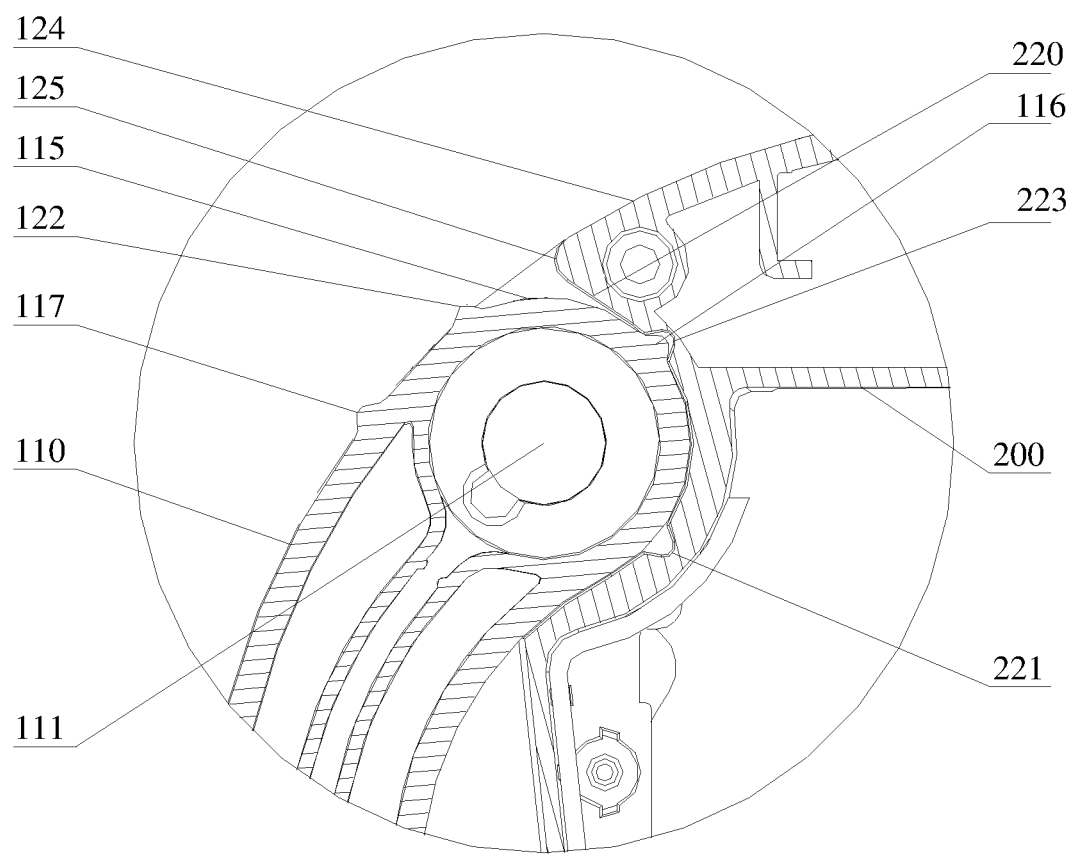
FIG. 14 is a structural schematic diagram showing yet another arm-base body connecting structure in an embodiment of the present disclosure.

FIG. 14 is a structural schematic diagram of the arm-base body connecting structure provided by yet another embodiment of the present disclosure.

With reference to FIG. 14, two base body matching parts are provided on the base body 200. Two grooves spaced apart are provided on the inner wall 220 to be adopted as two base body matching parts, i.e., the first base body matching part 221 and the second base body matching part 223. Two arm matching parts are provided on the arm 110. Two projections are provided on the outer surface 115 so as to be adopted as two arm matching parts, i.e., the first arm matching part 116 and a second arm matching part 122. The first arm matching part 116 and the second arm matching part 122 rotate along with the arm 110. The first base body matching part 221 and the second base body matching part 223 are positioned on the rotation tracks of the first arm matching part 116 and the second arm matching part 122.

In FIG. 14, the arm 110 is in the housed position, and the first arm matching part 116 is matched with the second base body matching part 223 by inserting. Therefore, the housed position of the arm 110 is effectively maintained by insertion matching of the first arm matching part 116 and the second base body matching part 223.

Figure 15:
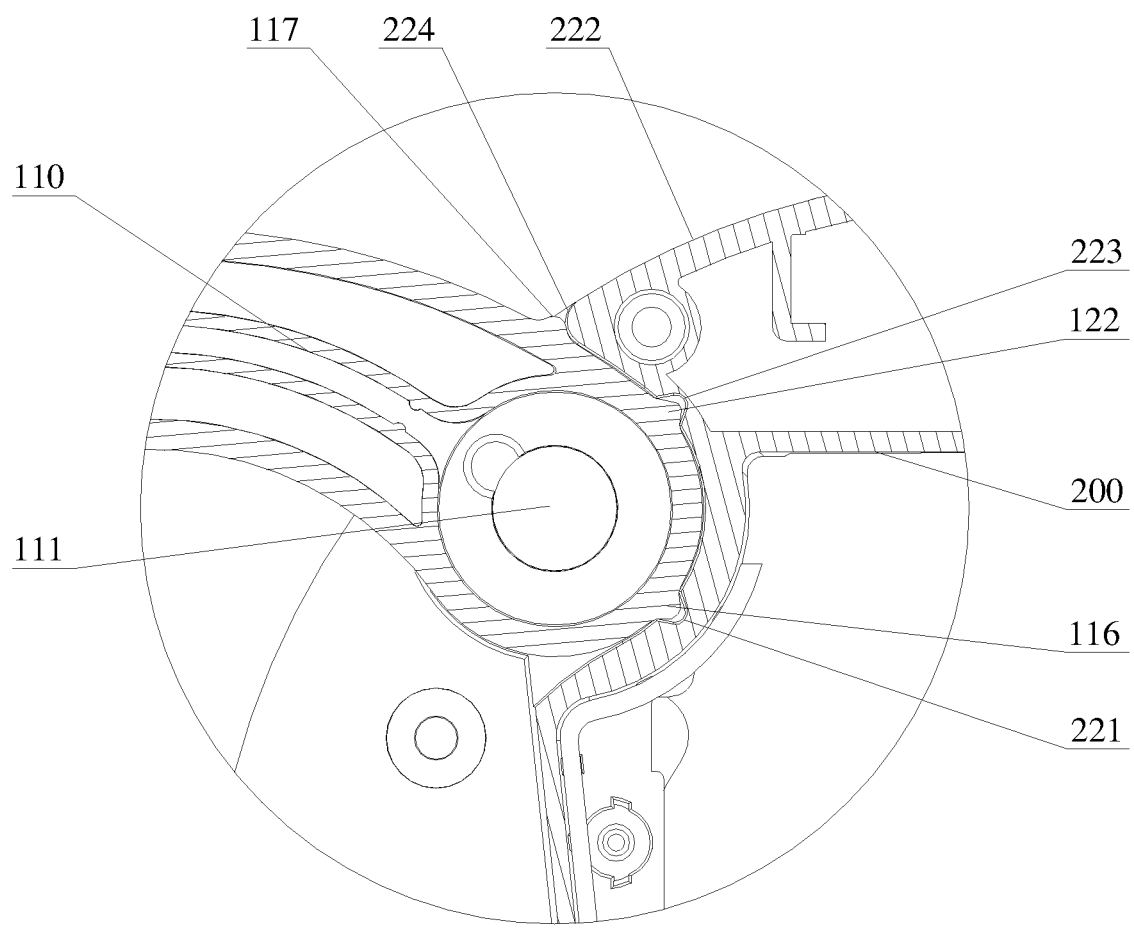
FIG. 15 is a state schematic diagram showing that the arm in FIG. 14 has moved to an unfolded position.

FIG. 15 is a state schematic diagram showing the arm 110 in FIG. 14 has rotated to the unfolded position. With reference to FIG. 15, the arm 110 rotates around the connecting end 111 to the unfolded position. The first arm matching part 116 enters the first base body matching part 221 and is matched with the first base body matching part 221 by insertion; the second arm matching part 122 enters the second base body matching part 223 and is matched with the second base body matching part 223 by insertion. Therefore, the unfolded position of the arm 110 is effectively maintained by insertion matching of the first arm matching part 116 and the first base body matching part 221 and insertion matching of the second arm matching part 122 and the second base body matching part 223. Therefore, the arm 110 will be more firmly maintained in the unfolded position, further improving stability of the arm 110 during the flight.

Figure 16:
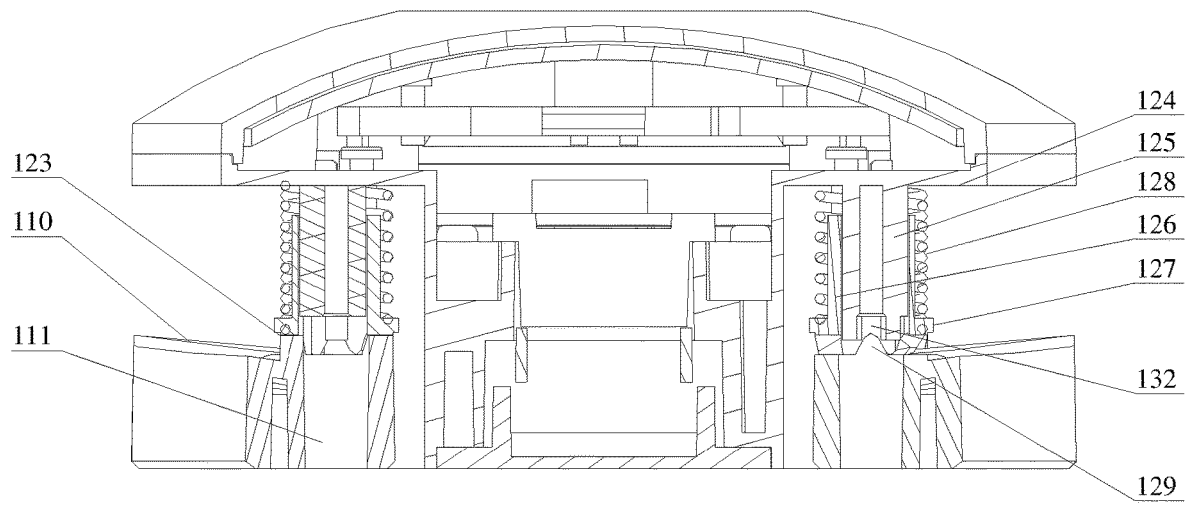
FIG. 16 is a structural schematic diagram showing yet another arm-base body connecting structure in an embodiment of the present disclosure.
Figure 17:
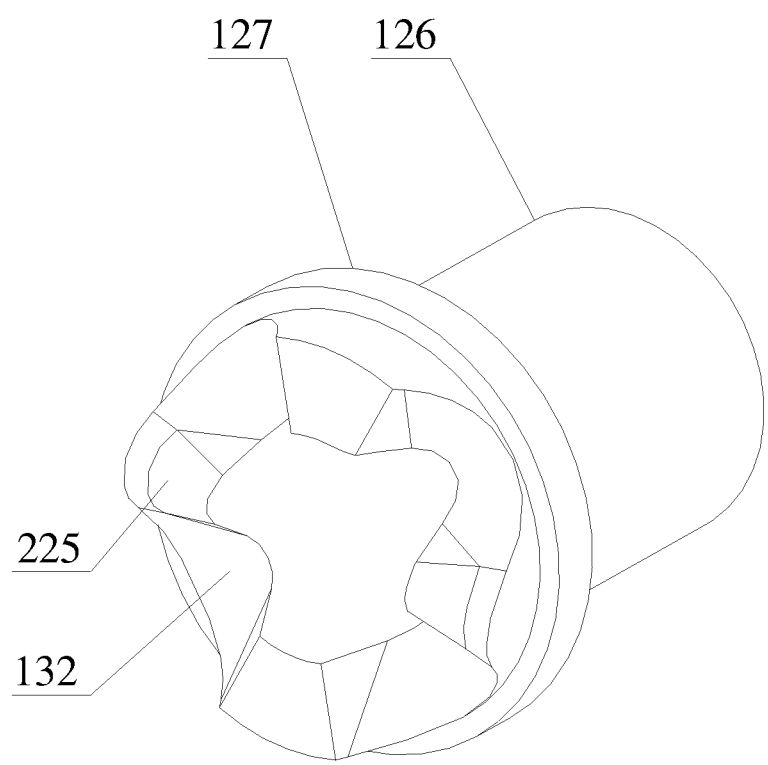
FIG. 17 is a structural schematic diagram of a sleeve in an embodiment of the present disclosure.

In yet another embodiment of the present disclosure, with reference to FIGS. 16 and 17, the base body 200 has a base body matching face 225 downwardly facing to the arms 100. At least one base body matching part is disposed on the base body matching face 225 to face to the arms 110; the arm 110 has an arm matching face 123 facing to the base body matching face 225. At least one arm matching part is provided on the arm matching face 123 to form an insertion matching with the at least one base body matching part.

At the connecting end 111 of the arm 110, the base body 200 is provided with a position limiting face 124 facing downwards. Camshafts 125, adopted as guide parts, are substantially vertically fixed on the position limiting face 124. Sleeves 126, adopted as limiting parts, are sleeved on the camshaft 125 in an up-and-down slidable manner respectively, and inner surfaces of the sleeves 126 are matched with outer surfaces of the camshafts 125 respectively, so that the sleeves 126 cannot rotate with respect to the corresponding camshafts 125. Convex rings 127 radically extending outwards are provided at a lower end of the sleeves 126 respectively. The elastic parts adopting reset springs 128 are sleeved on the sleeve 126 respectively, with one end of the reset spring 128 pressed against the position limiting face 124 and the other end of the reset spring 128 pressed against the convex ring 127. Elastic forces are applied onto the sleeve 126 by the reset springs 128, to drive the sleeve 126 away from the position limiting face 124. The lower end face of the sleeve 126 is provided as a base body matching face 225.

A projection 129 is provided on the arm matching face 123 so as to be adopted as one arm matching part.

FIG. 17 is a structural schematic diagram of the sleeve 126 in the embodiment of the present disclosure. With reference to FIG. 17, four grooves 132 are disposed on the base body matching face 225 of the sleeve 126 so as to be adopted as four base body matching parts.

Under the action of the elastic force of the reset spring 128, the projection 129 enters one of the grooves 132, and is matched with the groove 132 by inserting. Therefore, the position of the arm 110 is maintained. Along with rotation of the arm 110, the projection 129 is separated from the one of the groove 132 matched therewith, and the sleeve 126 overcomes the elastic force of the reset spring 128 to move upwards. Then, the projection 129 enters another groove 132, and is insertion matched with the groove 132 under the action of the elastic force of the reset spring 128.

In the embodiment, the projection 129 is matched with the grooves 132 at different positions, so that the arm 110 can be optionally maintained at four positions. Among the four positions, one position is the unfolded position, and one position is the housed position.

It should be noted that the number of the base body matching parts and the number of the arm matching parts are not limited. For example, the number of the arm matching parts is smaller than the number of the base body matching parts. For example, two base body matching parts and one arm matching part are provided, or four base body matching parts and two arm matching parts are provided, etc. It also should be noted that the base body matching parts can adopt the projections disposed on the base body matching face 225, and the arm matching parts can adopt the grooves 132 disposed on the arm matching face 123.

Figure 18:
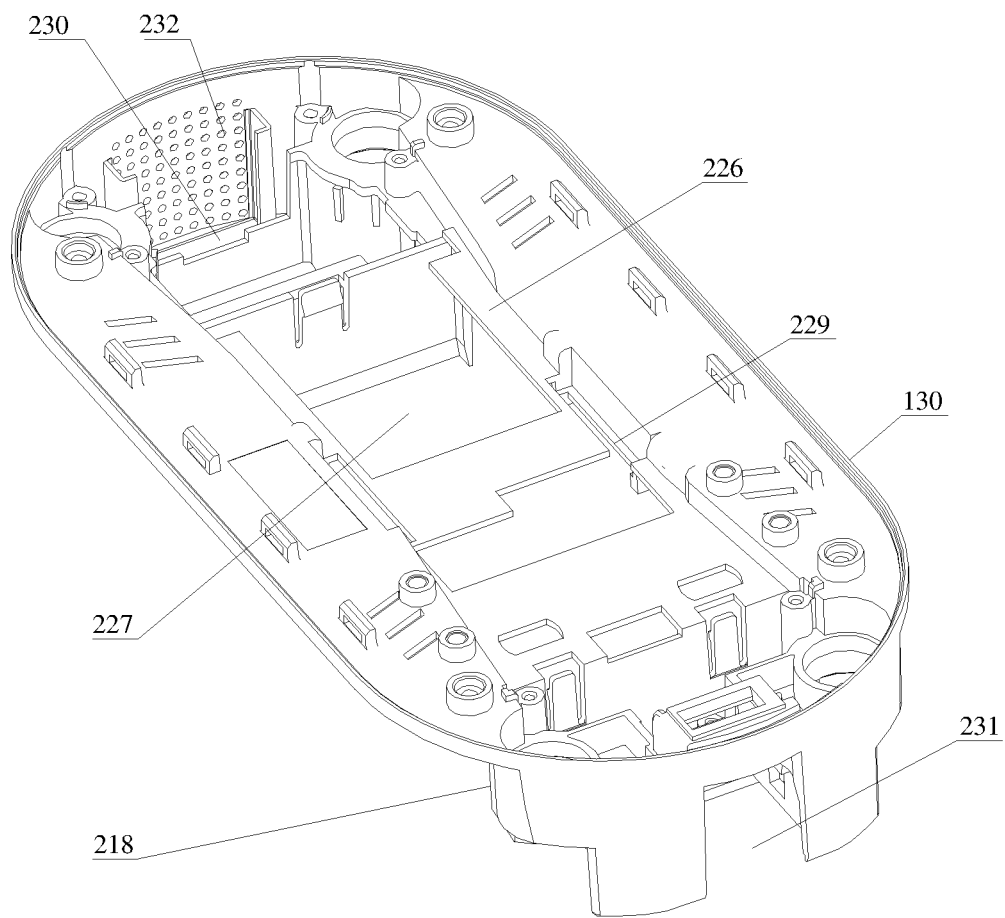
FIG. 18 is an axonometric view of the base body in the embodiment of the present disclosure.

FIG. 18 is an axonometric view of the base body 200 in the embodiment of the present disclosure. As illustrated in FIG. 18, a first accommodating recess 226 is formed by the downward recession of the upper surface 210 of the base body 200; and a second accommodating recess 227 is formed by the upward recession of the lower surface 216 of the base body 200. The second accommodating recess 227 is disposed below the first accommodating recess 226.

Figure 19:
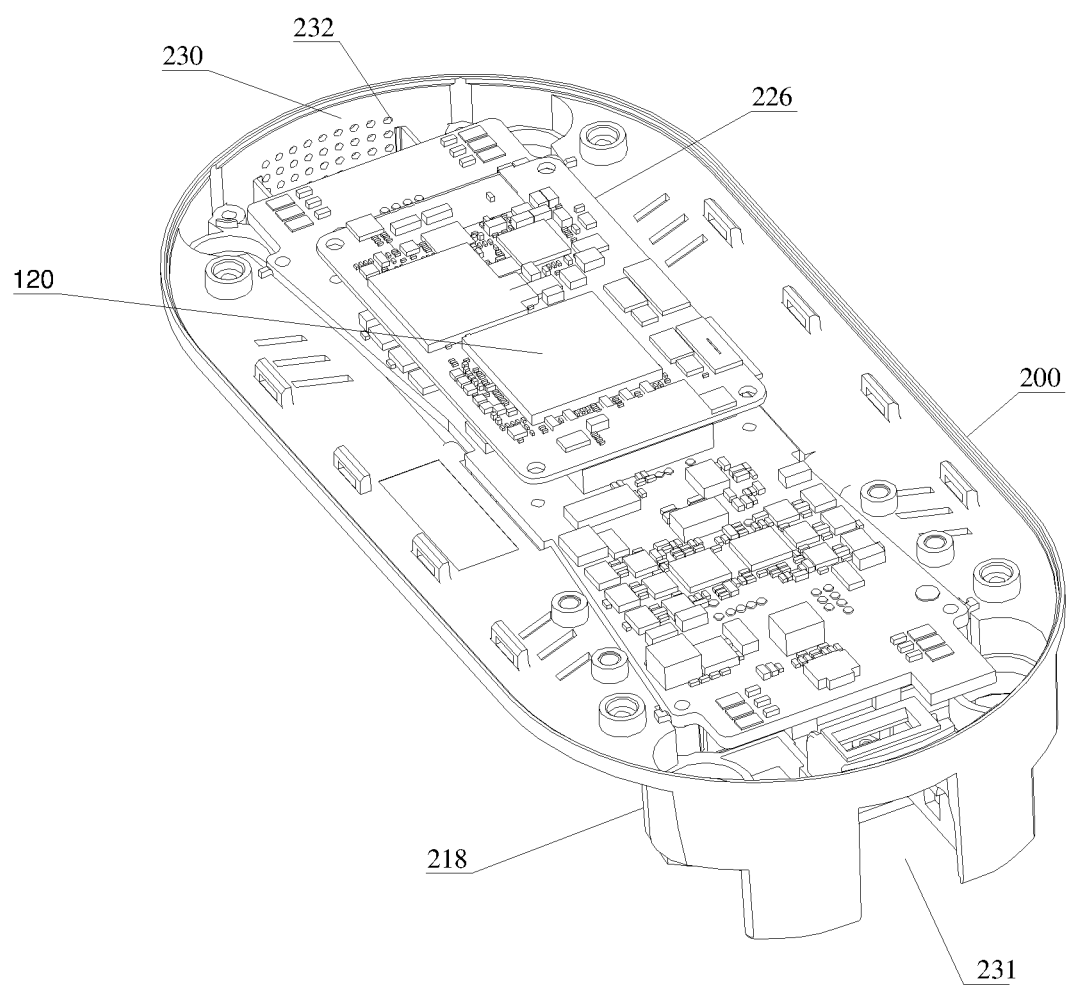
FIG. 19 is a structural schematic diagram of the unmanned aerial vehicle provided by the embodiment of the present disclosure, in which a circuit board is embedded in a first accommodating recess.

FIG. 19 is a structural schematic structural view of the unmanned aerial vehicle provided by an embodiment of the present disclosure, with the circuit board 120 embedded into the first accommodating recess 226. As illustrated in FIG. 19, the circuit board 120 can be integrated with a control circuit and a control chip of the unmanned aerial vehicle 1. The circuit board 120 is, for example, embedded into the first accommodating recess 226, so that the circuit board 120 can be configured for reinforcing the overall structural strength of the unmanned aerial vehicle 1. In this case, the circuit board 120 has a function of absorbing vibration and improving the overall stability of the unmanned aerial vehicle 1 in flight. Side wall of the first accommodating recess 226 can be formed into inclined surfaces, and the width of the first accommodating recess 226 is, for example, gradually reduced in the direction from top down, which is conducive to avoid the damage of the base body 200 during a pattern drawing of the base body 200 in the manufacturing process.

Figure 20:
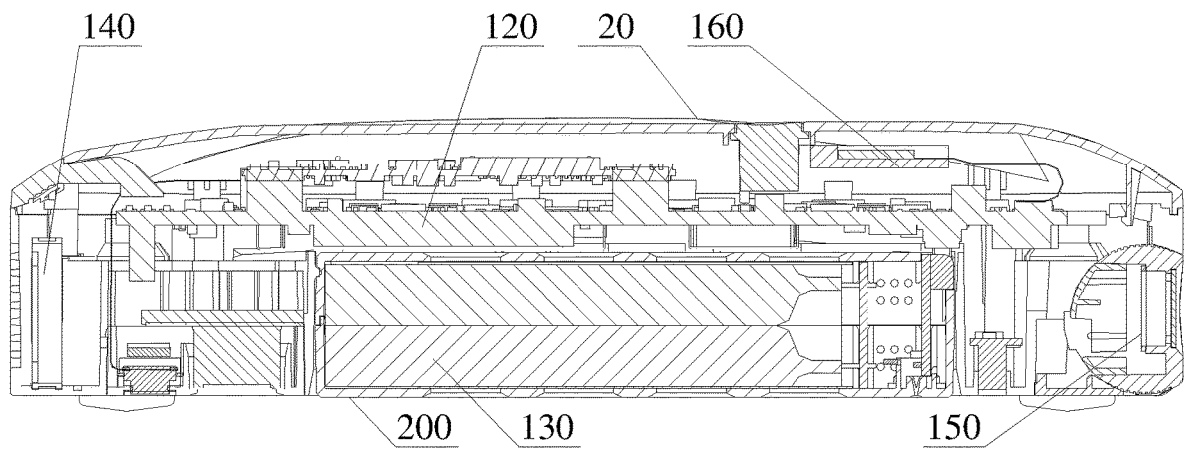
FIG. 20 is internal structural schematic diagram of the unmanned aerial vehicle provided by the embodiment of the present disclosure.

FIG. 20 is an internal structural schematic view of the unmanned aerial vehicle 1 provided by the embodiment of the present disclosure. As illustrated in FIG. 20, the sensor component 160 is directly mounted on the circuit board 120.

As illustrated in FIGS. 3, and 20, a battery 130 is embedded into the second accommodating recess 227. Similarly, because the battery 130 is embedded into the second accommodating recess 227, it can be used for reinforcing the overall structural strength of the unmanned aerial vehicle 1 and have a function of absorbing vibration and improving the overall stability of the unmanned aerial vehicle 1 in flight.

The weight of the battery 130 occupies a large part of the overall weight of the unmanned aerial vehicle 1. The second accommodating recess 227 is disposed below the first accommodating recess 226, so that the height of the battery 130 can be lower than that of the circuit board 120 in flight, and hence the overall center of gravity of the unmanned aerial vehicle 1 can be lowered. Therefore, the overall stability of the unmanned aerial vehicle 1 in flight can be further improved.

It should be noted that: the relative positional relationship between the circuit board 120 and the battery 130 is not limited to the above described. In another embodiment, the circuit board 120 can be disposed below the battery 130; or the circuit board 120 and the battery 130 can be disposed in a same level.

In the unmanned aerial vehicle 1 provided by the embodiment of the present disclosure, because the circuit boards 120 and/or the battery 130 are integrated on the base body 200 by being embedded into the base body 200, the circuit boards 120 and/or the battery 130 can reinforce the overall structural strength of the unmanned aerial vehicle 1 and hence have the function of absorbing vibration and improving the overall stability. Thus, the unmanned aerial vehicle 1 provided by the embodiment can still maintain high overall structural strength without using a damping structure, and hence the unmanned aerial vehicle 1 having the double-layered structure can have high overall stability in flight. Embedment and integration of any one of the circuit board 120 and the battery 130 into the base body 200 can greatly reinforce the overall structural strength of the unmanned aerial vehicle 1, thus a damping structure is no longer required. In the embodiment, both the circuit boards 120 and the battery 130 are integrated to the base body 200 by being embedded into the base body 200, so that the overall structural strength of the unmanned aerial vehicle 1 can be further optimized. Therefore, in another embodiment mode, one of the circuit boards 120 and the battery 130 can be integrated to the base body 200 by being embedded into the base body 200, and the other can be integrated into the base body 200 by bolting, bonding, adhering and so on.

In another embodiment mode, an elastic material can also be formed on an internal surface of the second accommodating recess 227 and/or an external surface of the battery 130, so that the external surface of the battery 130 can elastically abut against the internal surface of the second accommodating recess 227. Thus, the vibration absorption capability can be further improved, and hence the overall stability of the unmanned aerial vehicle 1 in flight can be improved.

In another embodiment mode, the battery 130 is fixed in the second accommodating recess 227 through fasteners, in order to fix the battery 130 more firmly in the base body 200. As illustrated in FIGS. 3 and 18, the battery fasteners 228 are disposed on both sides of the battery 130 in the width direction respectively, and battery slots 229 are disposed on two internal surfaces of the second accommodating recess 227 in the width direction respectively. After the battery 130 is embedded into the second accommodating recess 227, the battery fasteners 228 and the battery slots 229 are buckled, so that the battery 130 can be firmly fixed in the base body 200.

Referring to FIG. 18, the base body 200 may also be further provided with a third accommodating recess 230 and a fourth accommodating recess 231. The third accommodating recess 230 and the fourth accommodating recess 231 are arranged opposite to each other and disposed on both sides of the second accommodating recess 227 respectively. As illustrated in FIGS. 3 and 20, in an example, the third accommodating recess 230 is configured to accommodate a heat dissipation device 140, and the fourth accommodating recess 231 is configured to accommodate a camera device 150. The heat dissipation device 140 and the camera device 150 are disposed on two opposite sides of the second accommodating recess 227 respectively, so that the weight of the unmanned aerial vehicle 1 can be evenly distributed, and hence the overall stability of the unmanned aerial vehicle 1 in flight can be further improved.

It should be noted that in another embodiment mode, the third accommodating recess 230 and the fourth accommodating recess 231 can be arranged on a same side of the second accommodating recess 227.

As illustrated in FIGS. 3, 18 and 20, the third accommodating recess 230 is formed by the downward recession of the upper surface 210 of the base body 200. The heat dissipation device 140 is fixed in the third accommodating recess 230. The heat dissipation device 140 may be a radiating fan which rotates and removes heat produced in the working process of the unmanned aerial vehicle 1 from vents 232 formed on a side wall of the third accommodating recess 230. Of course, the heat dissipation device 140 can also be a radiating fin, a radiating pipe, etc.

The fourth accommodating recess 231 is formed by the inward recession of one end surface of the base body 200, and the camera device 150 is fixed in the fourth accommodating recess 231.

It should be noted that description is given in the embodiment by taking the case that the functional components of the unmanned aerial vehicle 1 include the arms 110, the circuit board 120, the battery 130, the heat dissipation device 140, the camera device 150 and the sensor component 160 as an example. In another embodiment mode, the functional components of the unmanned aerial vehicle 1 can be more or less than the above described. For example, the functional components of the unmanned aerial vehicle 1 can only include the circuit board 120, the battery 130 and the arms 110. Or, on the basis of the embodiment, functional components such as a gimbal, a support, a cargo fixture and a pesticide sprayer can be further integrated onto the base body 200.

The foregoing is only partial embodiments of the present disclosure and not intended to limit the present disclosure. Various changes and modifications may be made to the present disclosure by those skilled in the art. Any modification, equivalent replacement, improvement and the like made within the spirit and the principle of the present disclosure shall all fall within the scope of protection of the present disclosure.

The application claims priority to the Chinese patent application No. 201620366764.7, filed Apr. 27, 2016, and the Chinese patent application No. 201610948397.6, filed Oct. 26, 2016, the disclosure of which are incorporated herein by reference as part of the application.

The invention claimed is:

1. An unmanned aerial vehicle, with a double-layered structure formed by stacking a cover and a main component layer, wherein,
the main component layer comprises a base body and at least one functional component, the base body has a top facing to the cover and a bottom opposite to the top, the cover is in direct contact with the top of the base body,
the at least one functional component is mounted on the base body, and
the cover is not provided with any functional component.

2. The unmanned aerial vehicle according to claim 1, wherein, the base body comprises at least one accommodating recess, and the at least one functional component is disposed in the at least one accommodating recess of the base body.

3. The unmanned aerial vehicle according to claim 1, wherein, the at least one functional component comprises a circuit board, the at least one accommodating recess includes a first accommodating recess defined at the top of the base body, the circuit board is disposed in the first accommodating recess.

4. The unmanned aerial vehicle according to claim 1, wherein, the at least one functional component comprises a battery, the at least one accommodating recess comprises a second accommodating recess defined in the bottom of the base body, and the battery is disposed in the second accommodating recess.

5. The unmanned aerial vehicle according to claim 4, wherein, at least a portion of an outer surface of the battery is in resilient contact with at least a portion of an inner surface of the second accommodating recess.

6. The unmanned aerial vehicle according to claim 4, wherein, the battery is fixed in the second accommodating recess through a buckle structure.

7. The unmanned aerial vehicle according to claim 2, wherein, the at least one functional component comprises at least one arm, the at least one accommodating recess comprises at least one arm-accommodating recess, the at least one arm is movably connected to the base body, the at least one arm is switchable between an unfolded position and a housed position with respect to the base body, and the at least one arm in the housed position is located within the at least one arm-accommodating recess and is incorporated into a contour of the base body.

8. The unmanned aerial vehicle according to claim 7, wherein, a number of the at least one arm-accommodating recess is two, and a number of the at least one arm is four, the arm-accommodating recesses are formed on opposite sides in a width direction of the bottom of the base body, respectively, each of the arm-accommodating recesses is configured to receive two of the arms.

9. The unmanned aerial vehicle according to claim 8, wherein, each of the arms has a connecting end, the base body and the connecting end of each of the arms are connected by a connecting structure comprising at least one arm matching part provided on the arm and at least one base body matching part provided on the base body, the at least one arm matching part and the at least one base body matching part are bonded with each other to maintain the unfolded position and the housed position of the arm relative to the base body.

10. The unmanned aerial vehicle according to claim 9, wherein, at a connecting end of the arm connected to the base body, a protrusion portion extends in a direction perpendicular to a plane in which the arm moves, wherein a first through hole through which the protrusion portion passes is provided in the base body, and a top of the protrusion portion is provided with a flange configured to prevent the protrusion portion from detaching from the first through hole.

11. The unmanned aerial vehicle according to claim 10, wherein, the protrusion portion has a cylindrical shape in which a second through hole coaxial with the first through hole is provided.

12. The unmanned aerial vehicle according to claim 11, wherein, at least one slot is provided in a wall of the protrusion portion and penetrates through the wall of the protrusion portion, so that an outer diameter of the protrusion portion is variable under an external force.

13. The unmanned aerial vehicle according to claim 12, wherein, the connecting structure further comprises a reinforcing member disposed in the second through hole of the protrusion portion, the reinforcing member is configured to force the wall of the protrusion portion to be pressed against a sidewall of the base body adjacent to the first through hole.

14. The unmanned aerial vehicle according to claim 13, wherein, the reinforcement member comprises a bolt and a nut, an end of the bolt having no threads and close to the flange of the protrusion portion has a shape of circular truncated cone, a step portion is disposed on an inner surface of the wall of the protrusion portion, and the step portion is configured to restrict movement of the nut in the second through hole.

15. The unmanned aerial vehicle according to claim 9, wherein, the connecting end of the arm connected to the base body has an arc outer surface, the base body has an arc inner wall cooperating with the arc outer surface of the arm, the at least one arm matching part is disposed on the arc outer surface of the connecting end of the arm, and the at least one base body matching part is disposed on the arc inner wall of the base body.

16. The unmanned aerial vehicle according to claim 15, wherein,
the at least one arm matching part is a first recess disposed on the arc outer surface, and the at least one base body matching part is a second recess disposed on the arc inner wall and configured to form insertion matching with the at least one arm matching part, and
a center angle of the first recess or a center angle of the second recess is in the range from about 65 degrees to about 85 degrees.

17. The unmanned aerial vehicle according to claim 15, wherein,
the at least one arm matching part is a first projection disposed on the arc outer surface, and the at least one base body matching part is a second projection disposed on the arc inner wall and configured to form insertion matching with the at least one arm matching part, and
a spacing between the arc outer surface of the arm and the arc inner wall of the base body is smaller than a first height by which the first projection protrudes from the arc outer surface, or smaller than a second height by which the second projection protrudes from the arc inner wall.

18. The unmanned aerial vehicle according to claim 15, wherein, the at least one arm matching part comprises a chute provided on the arc outer surface of the arm, an elastic member provided in the chute, and a sliding block provided on the elastic member and serving as the first projection.

19. The unmanned aerial vehicle according to claim 17, wherein, the at least one arm matching part comprises a chute provided on the arc outer surface of the arm, and a sliding block made of a magnetic metal and serving as the first projection, and in the unfolded position of the arm, the sliding block enters into the at least one base body matching part under a suction of a magnet provided in the base body.

20. The unmanned aerial vehicle according to claim 15, wherein, the connecting structure further comprises an abutting part provided on the arc outer surface of the arm, and in a case where the arm is in the unfolded position, the abutting part abuts against the base body.

21. The unmanned aerial vehicle according to claim 9, wherein, the at least one arm matching part and the at least one base body matching part is formed of elastic material.

22. The unmanned aerial vehicle according to claim 9, wherein, the at least one arm matching part comprises a first arm matching part, the at least one base body matching part comprises a first base body matching part and a second base body matching part spaced apart from each other, the housed position of the arm is maintained by insertion matching of the first arm matching part with the second base body matching part, and the unfolded position of the arm is maintained by insertion matching of the first arm matching part with the first base body matching part.

23. The unmanned aerial vehicle according to claim 22, wherein, the at least one arm matching part further comprises a second arm matching part spaced apart from the first arm matching part, and the unfolded position of the arm is further maintained by insertion matching of the second arm matching part with the second base body matching part.

24. The unmanned aerial vehicle according to claim 9, wherein, the base body further has a base body matching face downwardly facing to the arm, the at least one base body matching part is disposed on the base body matching face to face to the arm; the arm further has an arm matching face facing to the base body matching face, the at least one arm matching part is provided on the arm matching face to form an insertion matching with the at least one base body matching part.

25. The unmanned aerial vehicle according to claim 24, wherein, the base body further comprises a position limiting face facing to the arm, a guide part perpendicularly fixed to the position limiting face, a limiting part sheathed on the guide part to slide upwards and downwards with respect to the position limiting face, a convex ring provided at a lower end of the limiting part and extending outwardly with respect to the limiting part, and an elastic part for applying an elastic force to the limiting part to drive the limiting part away from the position limiting face, one end of the elastic part is pressed against the position limiting face, and another end of the elastic part is pressed against the convex ring, and a lower end surface of the limiting part is provided as the base body matching face.

26. The unmanned aerial vehicle according to claim 25, wherein, the at least one arm matching part is one projection, the at least one base body matching part is two recesses spaced apart from each other, and the one projection cooperates with the two grooves under an action of the elastic part to respectively maintain the housed position and the unfolded position of the arm.

27. The unmanned aerial vehicle according to claim 25, wherein, the at least one arm matching part is two projections spaced apart from each other, the at least one base body matching part is four grooves spaced apart from each other, the two projections selectively cooperate with the four grooves under an action of the elastic part to respectively maintain the housed position and the unfolded position of the arm.

28. The unmanned aerial vehicle according to claim 25, wherein, the guide portion is a camshaft, the limiting part is a sleeve sheathed on the cam shaft, and the elastic part is a reset spring.

29. The unmanned aerial vehicle according to claim 28, wherein, the sleeve is non-rotating relative to the camshaft.

30. The unmanned aerial vehicle according to claim 24, wherein, the at least one arm matching part is a projection or a groove disposed on the arm matching face, and the at least one base body matching part is a recess or a projection configured to form insertion matching with the at least one arm matching part.

31. The unmanned aerial vehicle according to claim 3, wherein, the at least one functional component further comprises a heat dissipation device, the at least one accommodating recess further comprises a third accommodating recess defined at one end of the base body in the longitudinal direction, and the heat dissipation device is disposed in the third accommodating recess.

32. The unmanned aerial vehicle according to claim 31, wherein, the at least one functional component further comprises a camera device, the at least one accommodating recess further comprises a fourth accommodating recess at the other end of the base body in the length direction, the camera device is disposed in the fourth accommodating recess.

33. An unmanned aerial vehicle, with a double-layered structure formed by stacking a cover and a main component layer, wherein,
the main component layer comprises a base body and at least one functional component, the base body has a top facing to the cover and a bottom opposite to the top, the cover is in direct contact with the top of the base body, and the at least one functional component is mounted on the base body and comprises at least one of arm switchable between an unfolded position and a housed position with respect to the base body, and the at least one arm in the housed position is incorporated into a contour of the base body, and
the cover is not provided with any functional component.

34. An unmanned aerial vehicle, with a double-layered structure formed by stacking a cover and a main component layer, wherein,
the main component layer comprises a base body and at least one functional component, the base body has a top facing to the cover and a bottom opposite to the top, the cover is in direct contact with the top of the base body, and the at least one functional component is mounted on the base body and comprises a circuit board and a battery, the circuit board being mounted on the top of the base body and the battery being mounted on the bottom of the base body, and
the cover is not provided with any functional component.

* * * * *